(12) United States Patent
Connolly

(10) Patent No.: US 7,720,217 B1
(45) Date of Patent: May 18, 2010

(54) MUTE CONDITION INDICATOR

(75) Inventor: Stephen Connolly, Dublin (IE)

(73) Assignee: Avaya Inc., Basking Ridge, NJ (US)

( * ) Notice: Subject to any disclaimer, the term of this patent is extended or adjusted under 35 U.S.C. 154(b) by 349 days.

(21) Appl. No.: 11/756,175

(22) Filed: May 31, 2007

(51) Int. Cl.
*H04M 1/00* (2006.01)
*H04M 9/00* (2006.01)

(52) U.S. Cl. .................................. 379/421; 379/376.01

(58) Field of Classification Search ................ 379/421, 379/372, 376.01, 376.02, 419, 420.01–420.04; 381/370, 374
See application file for complete search history.

(56) References Cited

U.S. PATENT DOCUMENTS 6,069,943 A * 5/2000 David et al. ............ 379/202.01

2006/0245598 A1 * 11/2006 Batai ........................ 381/74
2006/0280295 A1 * 12/2006 Runcie .................... 379/88.26

* cited by examiner

*Primary Examiner*—Tuan D Nguyen
(74) *Attorney, Agent, or Firm*—Chapin IP Law, LLC; David W. Rouille, Esq.

(57) ABSTRACT

A method and apparatus for providing a mute condition indicator is presented. In a communication set for a telephone, the communication set including a speaker and a microphone, a mute condition is indicated with an indicator disposed adjacent the microphone. The indicator is operable to indicate to a user of the communication set that a mute condition for the microphone is active while the user is using said communication set.

14 Claims, 4 Drawing Sheets

MUTE CONDITION INDICATOR

BACKGROUND

Telephones and telephone calls have become ubiquitous. There are numerous types of telephones and various combinations of wired handsets, wireless handsets, wired headsets, wireless headsets and telephones which have the speaker and microphone integrated into the base unit to provide a single unitary telephone and communication set, not to mention cellular telephones and Personal digital Assistants (PDAs) having telephones built in.

One particular type of telephone call is a conference call. A conference call is a telephone call in which three or more people converse simultaneously. Many companies use conference calls as a meeting tool or to distribute information to a large number of listeners at the same time. Conference calls connect people through a conference bridge, which is essentially a server that acts like a telephone and can answer multiple calls simultaneously. Software plays a large role in whether the bridge has capabilities beyond simply connecting multiple callers. A company can have its own bridge or can contract with a service provider for conference call hosting. Providers frequently offer add-on features for conference calls, such as attendee polling, call recording and in-call operators or attendants.

The simplest phone teleconference is a three-way call, available in many homes as a service from the telephone company. Another very simple (but not necessarily effective) method is to have two groups of people talk to one another via speakerphone. The limits of three-way calling and the sound quality of speakerphones make both of these options impractical for most businesses.

Conference calls let groups of people—from a few to hundreds—communicate by phone. Banks and brokerages often use conference calls to give status reports to large numbers of listeners. Other businesses use conference calls to help coworkers communicate, plan and brainstorm.

Many phone conferencing systems require a login and personal identification number (PIN) to access the system. This helps protect confidential and proprietary information during the call. Videophones can add a visual element to conference calls, but businesses often need to share other visual information. Web conferencing allows people to communicate through text and video in addition to audio. The simplest web conferencing methods use chat and instant messaging programs to host text-based group discussions. More sophisticated programs exchange visual information with web cams and streaming video. Some allow people to share documents online.

SUMMARY

Conventional mechanisms such as those explained above suffer from a variety of deficiencies. One such deficiency is that a party to a call may be placed in a mute condition, either by the party itself or by a moderator of the conference. For example, if the party is in a noisy environment, he or she may desire to mute himself or herself when not speaking such that the background noise from the noisy environment is not broadcast to other call participants. Additionally, some advanced phones provide for a mute indicator on the phone body to indicate that the party has placed themselves on mute. Often the party is turned away from the phone body (as they are using a headset) and may not notice the indicator light).

Certain handsets or headsets do not provide for an indicator that the party has been placed in a mute condition, and the party may begin to speak, not realizing he or she has been muted. An audio indicator of a mute condition may not work.

Embodiments of the invention significantly overcome such deficiencies and provide mechanisms and techniques that provide an indictor for indication that a party is in a mute condition.

In a particular embodiment of a method for providing an indication of a mute condition, the method includes in a communication set for a telephone, the communication set including a speaker and a microphone, indicating a mute condition with an indicator disposed adjacent the microphone, the indicator operable to indicate to a user of the communication set that a mute condition for the microphone is active. The mute indicator is observable by the user while the user is using the communication set.

Other embodiments include an apparatus comprising a communication set for a telephone, the communication set including a speaker and a microphone. The apparatus further includes an indicator of a mute condition disposed adjacent the microphone, the indicator operable to indicate to a user of the communication set that a mute condition for the microphone is active. The mute indicator is observable by the user while the user is using the communication set.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a mute condition indicator as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a mute condition indicator as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Telephones include a speaker and a microphone, collectively referred to as a communication set. Some telephones have the communication set integrated into the base unit, while other types of telephones utilize a handset or headset which include the communications set. The communication set may be wired or wireless.

Figure 1:
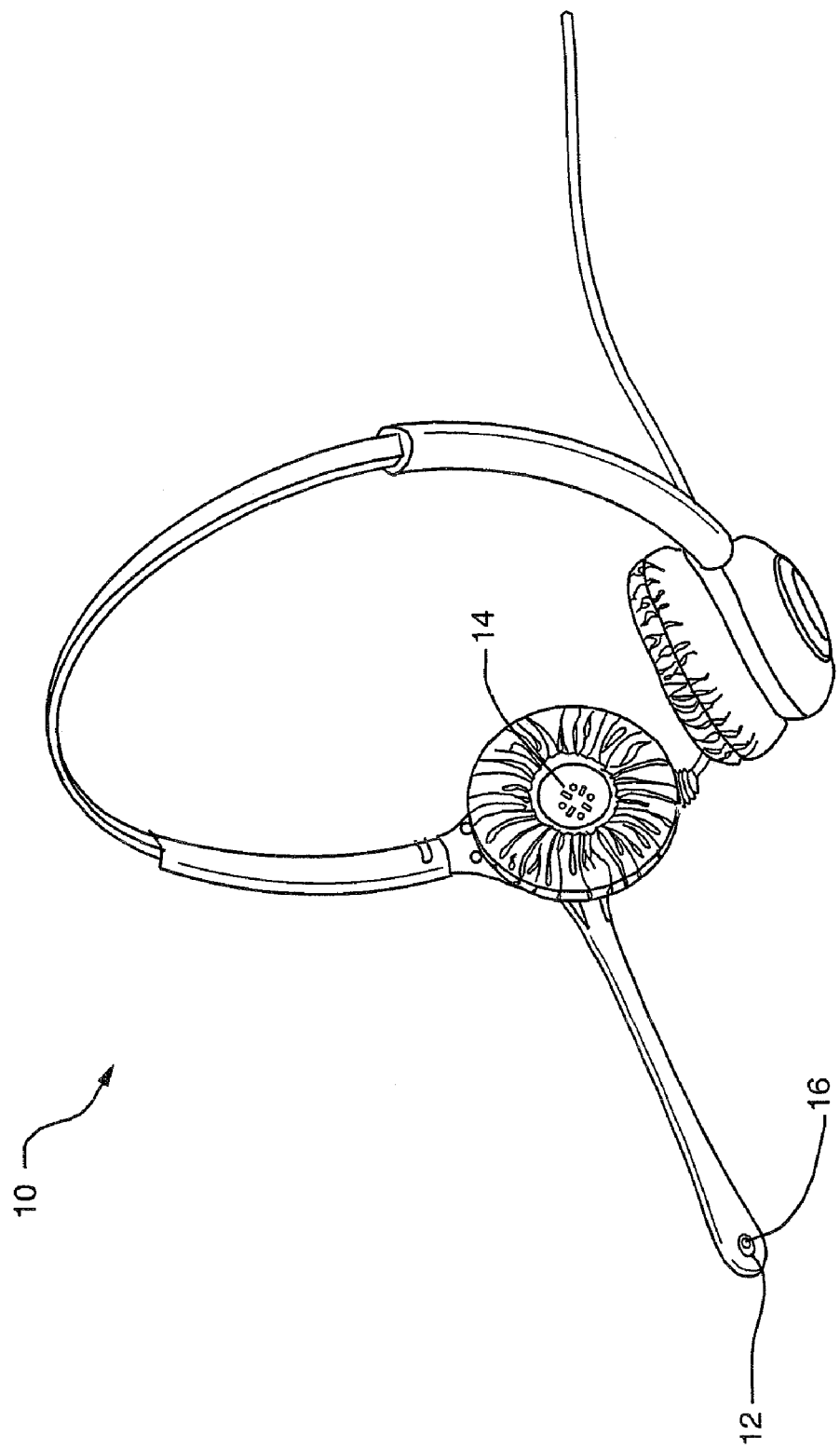
FIG. 1 depicts a telephone headset including a mute condition indicator in accordance with embodiments of the invention.

Referring now to FIG. 1, a telephone headset 10 is shown. The telephone headset 10 includes a microphone 12 that a user of the headset would use when speaking to other part or parties of the call. The headset 12 also includes a speaker 14 for hearing the other party of the call. Also shown is a mute condition indicator 16. The mute condition indicator 16 is included within the microphone cavity.

In this example, the mute condition indicator includes a light emitting diode (LED) which indicates a variety of conditions to the user while the user is involved in the call. The indicator may use other technology than LEDs. Although LEDs are the currently best choice in terms of duty cycle, power requirements, etc. Alternatively, a multi-color LED may be used (especially when embedded within the microphone cavity).

The lighting of the LED may indicate that the user has been placed in a mute condition. This may have been done by the user. For example, if the user was in a noisy environment, the user may mute his headset in order to avoid subjecting the other parties of the call to the noisy environment. Alternately, the user may have been muted by another party. For example, in a moderated conference, the moderator may have muted the user. The mute condition indicator 16 may be activated to indicate to the user that the user is in a mute state, as the user may otherwise be unaware.

In additional embodiments, the mute condition indicator may include a plurality of LEDS or may be used in conjunction with one or more other LEDS to indicate various statuses of the user. For example, mute indicator may provide functions such as flashing on and off, steady on, bright, dim, and different colors for different indications. The different indications may include an incoming call, a message arrival, a scheduled appointment time, a low battery indication and the like. The led may be a steady on to indicate the mute condition, blink to indicate a low batter condition, be a different color to indicate another call is coming in, and the like.

In a particular embodiment, the indicator actions are configurable by the phone use on the phone. For example, the user can configure on their phone such that Remote Mute=Steady Red, Local Mute=Slow Blinking Red, Clear to talk=Steady Green, Incoming call=Flashing Yellow, Voicemail waiting= . . . and the like.

It is important that the colors and flashing are configurable as some users may be color blind (thus can only use flashing), others may suffer from light triggered epilepsy (thus can only use slow flashes or colors) and others may find the whole thing too distracting (thus may want to turn the functionality off completely).

Figure 2:
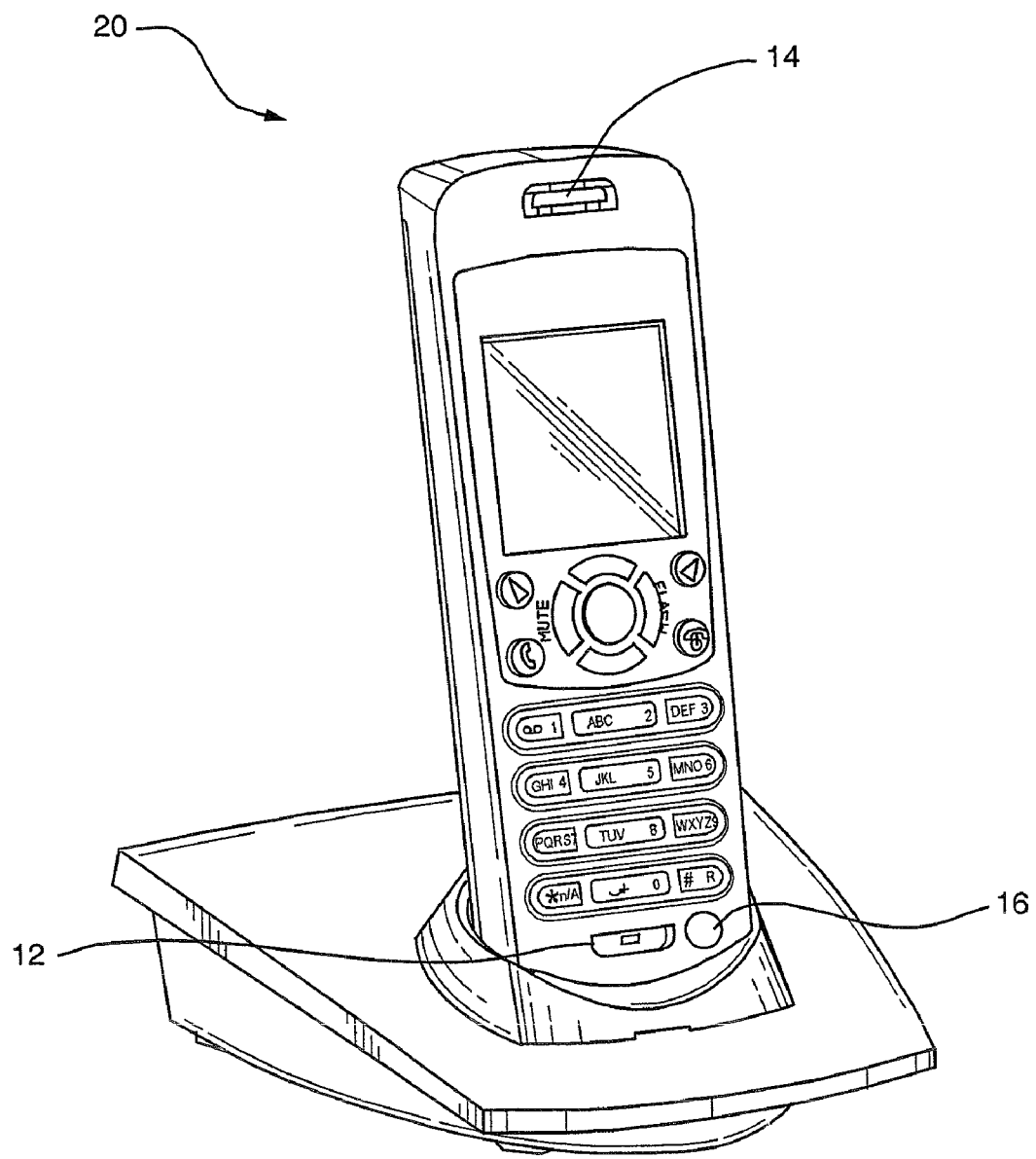
FIG. 2 depicts a telephone handset including a mute condition indicator in accordance with embodiments of the invention.

Referring now to FIG. 2, an additional embodiment is shown. In this embodiment 20, the communication set is incorporated with the telephone itself in a single package. The phone 20 includes a microphone 12 that a user of the headset would use when speaking to other part or parties of the call. The headset 12 also includes a speaker 14 for hearing the other party of the call. Also shown is a mute condition indicator 16. In use, when the user is placed in a mute condition (either by the user or by another party), the mute condition indicator turns on, thereby providing a visual indication to the user that the user has been muted.

In a conference call, on a phone capable of receiving and understanding messages from a conference bridge, the phone can be placed in a mute condition by the moderator of the conference. A first message from the conference bridge (e.g., a message using the SIP protocol) mutes the users phone, while a second message from the conference bridge places the users phone in an un-muted condition.

Figure 3:
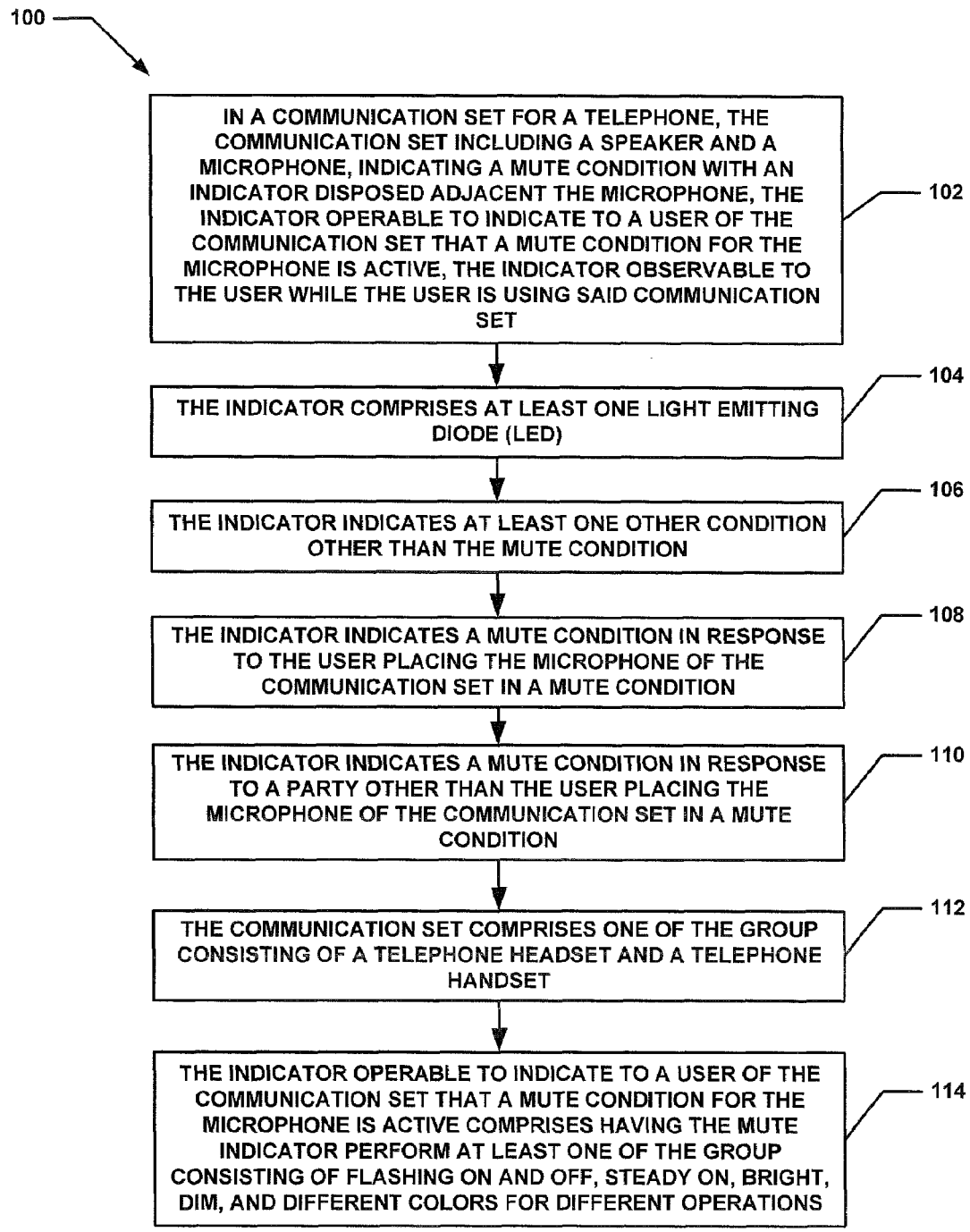
FIG. 3 depicts a flow diagram of a particular embodiment of a method of providing a mute condition indicator in accordance with embodiment of the invention.
Figure 4:
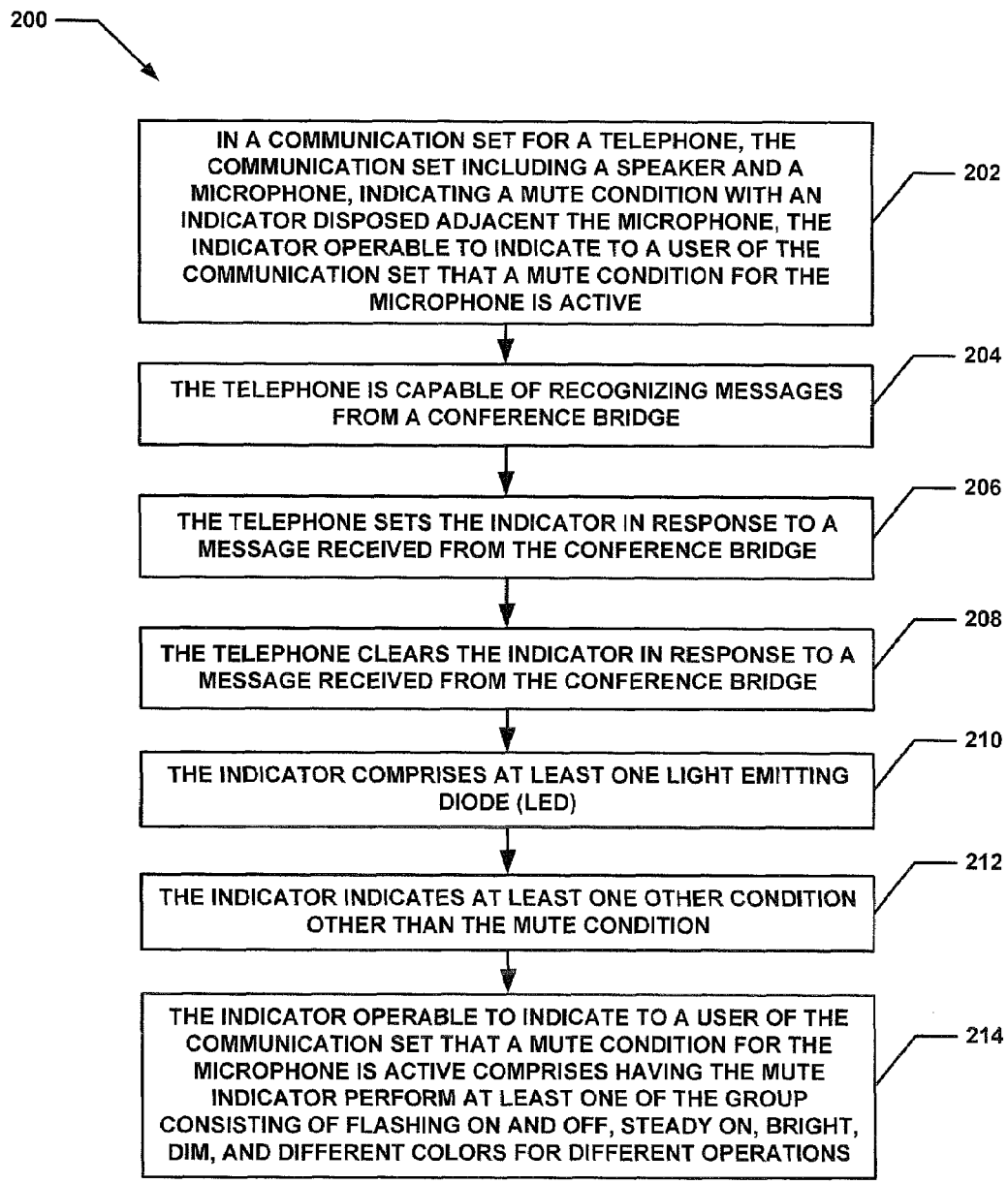
FIG. 4 depicts a flow diagram of a particular embodiment of a method of providing a mute condition indicator as part of a conference call environment in accordance with embodiments of the invention.

A flow chart of the presently disclosed methods is depicted in FIGS. 3 and 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 100 of providing a mute condition indication is shown. The method 100 begins with processing block 102 which discloses in a communication set for a telephone, the communication set including a speaker and a microphone, indicating a mute condition with an indicator disposed adjacent the microphone, the indicator operable to indicate to a user of the communication set that a mute condition for the microphone is active while the user is using the communication set.

Processing block 104 states wherein the indicator comprises at least one light emitting diode (LED). While a single LED may be used other types of indicators and numbers of indicators could also be used.

Processing block 106 recites the indicator indicates at least one other condition other than the mute condition. These conditions include, but are not limited to an incoming call, a message arrival, a scheduled appointment time, a low battery indication and the like.

Processing block 108 discloses wherein the indicator indicates a mute condition in response to the user placing the microphone in a mute condition. For example, if the party is in a noisy environment, he or she may desire to mute himself or herself when not speaking such that the background noise from the noisy environment is not broadcast to other call participants.

Processing block 110 states wherein the indicator indicates a mute condition in response to a party other than the user placing the microphone in a mute condition. For example, in a moderated conference, the moderator may have muted the user.

Processing block 112 recites wherein the communication set comprises one of the group consisting of a telephone headset and a telephone handset. The telephone handset may be wired or wireless and the telephone headset may be wired or wireless.

Processing block 114 discloses wherein the indicator operable to indicate to a user of the communication set that a mute condition for the microphone is active comprises having the mute indicator perform at least one of the group consisting of flashing on and off, steady on, bright, dim, and different colors for different conditions. For example, the different conditions may be a steady on to indicate the mute condition, blink to indicate a low batter condition, be a different color to indicate another call is coming in, and the like. Further, in some embodiments the indictor actions are configurable by the user.

Referring now to FIG. 4, a particular embodiment of a method 200 for indicating a mute condition for a teleconference participant is shown. Method 200 begins with processing block 202 which states in a communication set for a telephone, the communication set including a speaker and a microphone, indicating a mute condition with an indicator disposed adjacent the microphone, the indicator operable to indicate to a user of the communication set that a mute condition for the microphone is active while the user is using the communication set.

Processing block 204 recites wherein the telephone is capable of recognizing messages from a conference bridge. In a conference call, on a phone capable of receiving and understanding messages from a conference bridge, the phone can be placed in a mute condition by the moderator of the conference.

Processing block 206 discloses wherein the telephone sets the indicator in response to a message received from the conference bridge. A first message from the conference bridge (e.g., a message using the SIP protocol) mutes the users phone. Processing block 208 states wherein the telephone clears the indicator in response to a message received from the conference bridge. A second message from the conference bridge places the users phone in an un-muted condition.

Processing block 210 recites wherein the indicator comprises at least one light emitting diode. While a single LED may be used other types of indicators and numbers of indicators could also be used.

Processing block 212 discloses wherein the indicator indicates at least one other condition other than the mute condition. These conditions include, but are not limited to an incoming call, a message arrival, a scheduled appointment time, a low battery indication and the like.

Processing block 214 states wherein the indicator operable to indicate to a user of the communication set that a mute condition for the microphone is active comprises having the mute indicator perform at least one of the group consisting of flashing on and off, steady on, bright, dim, and different colors for different operations. For example, the different conditions may be a steady on to indicate the mute condition, blink to indicate a low batter condition, be a different color to indicate another call is coming in, and the like.

An apparatus and method for providing an indication of a mute condition have been described. The telephone includes a communication set, the communication set including a speaker and a microphone. The telephone also includes an indicator of a mute condition disposed adjacent to or incorporated with the microphone, the indicator operable to indicate to a user of the communication set that a mute condition for the microphone is active, the indicator observable by the user while the user is using the communication set.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. An apparatus comprising:
    a communication set for a telephone, wherein said communication set comprises one of the group consisting of a telephone headset and a telephone handset, said communication set including a speaker and a microphone; and
    an indicator of a mute condition disposed adjacent said microphone, said indicator operable to indicate to a user of said communication set that a mute condition for said microphone is active, said indicator observable by the user while the user is using said communication set, wherein said telephone is capable of recognizing messages from a conference bridge, wherein said telephone sets said indicator in response to a message received from said conference bridge and wherein said telephone clears said indicator in response to a message received from said conference bridge.

2. The apparatus of claim 1 wherein said indicator comprises at least one light emitting diode.

3. The apparatus of claim 1 wherein said indicator indicates at least one other condition other than said mute condition.

4. The apparatus of claim 1 wherein said indicator indicates a mute condition in response to said user placing said microphone of said communication set in a mute condition.

5. The apparatus of claim 1 wherein said indicator indicates a mute condition in response to a party other than said user placing said microphone of said communication set in a mute condition.

6. The apparatus of claim 1 wherein said indicator operable to indicate to a user of said communication set that a mute condition for said microphone is active comprises having said mute indicator perform at least one of the group consisting of flashing on and off, steady on, bright, dim, and different colors for different operations.

7. The apparatus of claim 1 wherein an action indicated by said indicator is user configurable.

8. The method of claim 7 further comprising wherein an action indicated by said indicator is user configurable.

9. A method comprising: in a communication set for a telephone, wherein said communication set comprises one of the group consisting of a telephone headset and a telephone handset, said communication set including a speaker and a microphone, indicating a mute condition with an indicator disposed adjacent said microphone, said indicator operable to indicate to a user of said communication set that a mute condition for said microphone is active while the user is using said communication set, wherein said telephone is capable of recognizing messages from a conference bridge, wherein said telephone sets said indicator in response to a message received from said conference bridge and wherein said telephone clears said indicator in response to a message received from said conference bridge.

10. The method of claim 9 wherein said indicator comprises at least one light emitting diode.

11. The method of claim 9 wherein said indicator indicates at least one other condition other than said mute condition.

12. The method of claim 9 wherein said indicator indicates a mute condition in response to said user placing said microphone in a mute condition.

13. The method of claim 9 wherein said indicator indicates a mute condition in response to a party other than said user placing said microphone in a mute condition.

14. The method of claim 9 wherein said indicator operable to indicate to a user of said communication set that a mute condition for said microphone is active comprises having said mute indicator perform at least one of the group consisting of flashing on and off, steady on, bright, dim, and different colors for different operations.

* * * * *